3,840,468
METHOD FOR SEPARATING WATER FROM EMULSIONS CONTAINING OIL AND DEVICE FOR SAME

Horst Rogenhofer, Rottendorf, and Hans Hillinger, Retzstadt, Germany, assignors to SKF Kugellagerfabriken GmbH, Schweinfurt, West, Germany
Filed Mar. 29, 1972, Ser. No. 239,190
Claims priority, application Germany, Mar. 31, 1971, P 21 15 589.5
Int. Cl. B01d 17/04, 19/00
U.S. Cl. 252—328    2 Claims

ABSTRACT OF THE DISCLOSURE

The invention is directed to a method and a device for separating emulsions, particularly of emulsions of used-up oil and water. The emulsion is fed into a falling-film evaporator in which it is spread out to a thin film. The water contained in the emulsion is evaporated and the vapour rises to a vapour chamber while the heavier volatile constituents of the emulsion like oil and emulsifying agents are fed via the outlet into a receiving container.

BACKGROUND OF THE INVENTION

The invention relates to a method and a device for separating emulsions, particularly of emulsions of used-up oil and water.

Emulsions consisting of water and oil and also containing emulsifying agents for stabilization are used in the metal cutting industry for lubrication and cooling of tools and work pieces. Similar emulsions are also used for washing of work pieces. In view of the constantly growing pollution of the environment the used-up emulsions must be separated to the greatest possible extent from the oil and the emulsifying agents before they may be drained into the sewage. Current official regulations do not permit the content of residual oil in the sewage to exceed 40 mg./l. (0.0025 lb./cu. ft.).

Various methods for the separation of oil from emulsions are known and are mainly carried out chemically. For example, the following methods of separating oil/water emulsions are known:

The chemical separation of oil based on the principle that the oil is absorbed by flakes formed of a multi-component medium. The main constituent of the medium is a high-dispersion hydrophobic silicic acid which is for instance used as flocculation agent. By its oleophilic reaction the silicic acid binds the oil to a crumbling cake which must be filtered and subsequently burnt. This process is very expensive. Moreover, separation of very stable emulsions is rather unsatisfactory because the content of residual oil greatly exceeds the above-mentioned official limit.

Another method comprises the breaking of the emulsion by adding ferric chlorides; hereafter the emulsion is filled into a separate container with caustic soda and used oil. The oil is then separated from the water by flotation. The oil deposit is drained and burnt. The residual content of chloride in the burning is disadvantageous because hydrochloric acid easily arises. Another disadvantage of this method of separation is that it cannot be carried out in a continuous manner.

The prior art includes other methods where emulsions are broken by adding sulphuric or hydrochloric acid. These methods also have the disadvantage that the drained oil cannot readily be burnt in a boiler plant because of the acidic content. The acid separating water must be neutralized when employing this method and because of the generation of hydrogen it is necessary to ensure a sufficient ventilation in the separating plant. In addition, this method cannot readily be used to separate washing water and grinding coolant which contain nitrites, since in this case separation will generate nitrogen peroxide which may not directly be discharged into the open air. The equipment used must furthermore be made of acidproof material.

Finally it is also possible to burn the emulsion in order to separate the constituents of oil and water. To ensure satisfactory burning, however, the flame temperature must not be allowed to fall under 750 to 800° C. (1382 to 1472° F.) in order to avoid sooting and coking residues. To ensure such a high temperature in the oven an addition of approximately 300 l. (10.6 cu. ft.) of oil is required per 1 cubic meter of emulsion. This makes the process too expensive. Moreover, after the burning process the whole emulsion is discharged in form of vapour which must be cleaned before finally being discharged into the open air.

It is among the objects of the present invention to avoid the disadvantages of known methods; to provide a method and device to separate emulsions, particularly used-up oil and water emulsions; which is economical to operate; the cost of usage of which is not excessive and provides as complete separation as possible of the constituents water and oil particularly when containing emulsifying agents; and which results only in new emulsions which are largely acidproof.

SUMMARY OF INVENTION

According to the present invention an emulsion, particularly a used-up oil and water emulsion including emulsifiers is caused to fall in a vertical path and is simultaneously spread to a thin film and heated to ensure evaporation of the water. Preferably the film is turbulent.

The advantage of the present method is that it can be carried out without high expense and provides separation results having residual oil content below the maximum limits set by official agencies and in a most economical manner. The separation does not depend upon the use of chemicals which could possibly result in the creation of new emulsions and it is therefore safe in the end product and itself can be used for any future emulsion. Since separation can be insured without use of chemicals, the drained and condensed water vapour can generally be discharged into sewage.

The invention also relates to a device used to carry out the method for separating emulsions. The device consists of a feeding container, a pump, a condenser and a falling-film evaporator comprising a heated cylinder, a driven shaft supported inside the cylinder, the shaft being provided with a number of swinging or rigid scrapers. The scrapers touch the inside of the cylinder when the shaft is rotating. To the upper part of the shaft a manifold is attached, at the level of which a feed pipe discharges into the cylinder. A discharge pipe leads from the vapour chamber of the cylinder situated above the manifold to the condenser. The bottom part of the falling-film evaporator falls into an outlet discharging into a receiving container.

In a preferred embodiment, the condenser is used to preheat the emulsion in the feed pipe, before it is discharged into the evaporator.

In another embodiment of the invention, the falling-film evaporator does not have the mechanical stirrer as the rotor system with scrapers, in order to spread out the emulsion, but has an arrangement for generating a twist, which helps to spread the film. In a further embodiment the emulsion is spread out to a thin film by the aid of a recirculating gas.

DESCRIPTION OF INVENTION

Figure 1:
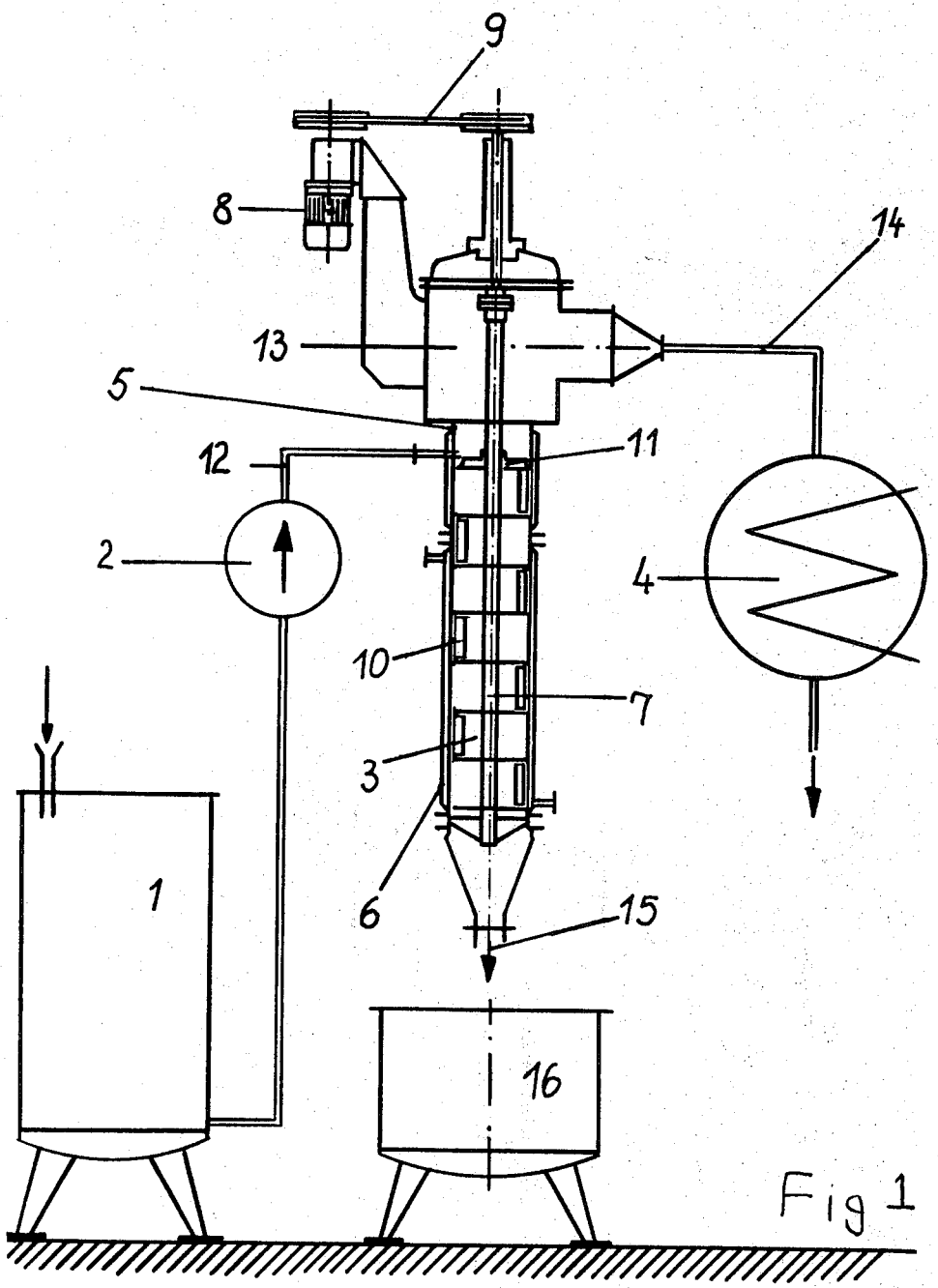
FIG. 1 is a diagrammatic view of a first embodiment of the device for separating emulsions.

As seen in FIG. 1 the device comprises mainly of a feeding container 1, a proportioning pump 2, a falling-film evaporator 3 and a condenser 4. The falling-film evaporator 3 consists of a cylinder 5 embedded at almost its whole length in a heating jacket 6. The cavity between cylindrical body 5 and heating jacket 6 can be filled with hot water, vapour or another carrier media for heating. Electrical heating can also be employed. Inside the cylindrical body 5 there is supported a shaft 7 driven by means of a motor 8 via a belt drive 9 or similar transmission. The shaft 7 is provided with a number of swinging scrapers 10 which are arranged in such a way that they touch the inside of the cylindrical body 5 when the shaft 7 is rotating to spread the emulsion in a thin film of constant thickness. A manifold 11 is attached to the upper part of the shaft 7. At the level of the manifold 11 a feed pipe 12 discharges into the cylindrical body 5. A discharge pipe 14 leads from the vapour chamber 13 of the cylindrical body 5 situated above the manifold 11 to the condenser 4. The bottom part of the falling-film evaporator 3 is conical and falls into an outlet 15 discharging into a receiving container 16.

The operation is as follows: The oil-water emulsion stored in the container 1 is fed via the proportioning pump 2 to the upper end of the falling-film evaporator 3. From there it flows through the manifold 11 and is spread out by the rotating scrapers 10 to a thin turbulent film on the inner wall of the cylindrical body 5. The water contained in the emulsion is quickly evaporated since the wall of the cylindrical body 5 is heated and the vapor rises into the vapor chamber 13 being fed via the discharge pipe 14 to the condenser 4. A separator is positioned in the vapor chamber 13 to prevent fluid particles from being carried forward into the condenser 4. The heavier volatile constituents of the emulsion like oil and emulsifying agents are fed via the outlet 15 into the receiving container 16. The water flowing from the condenser 4 can be further purified in a successive device, removing from it the free oils, the more easily boiling hydrocarbons or foreign substances which possibly still contained. It is also possible to feed the condensed water back into the falling-film evaporator 3 for a repeated cleaning.

Figure 2:
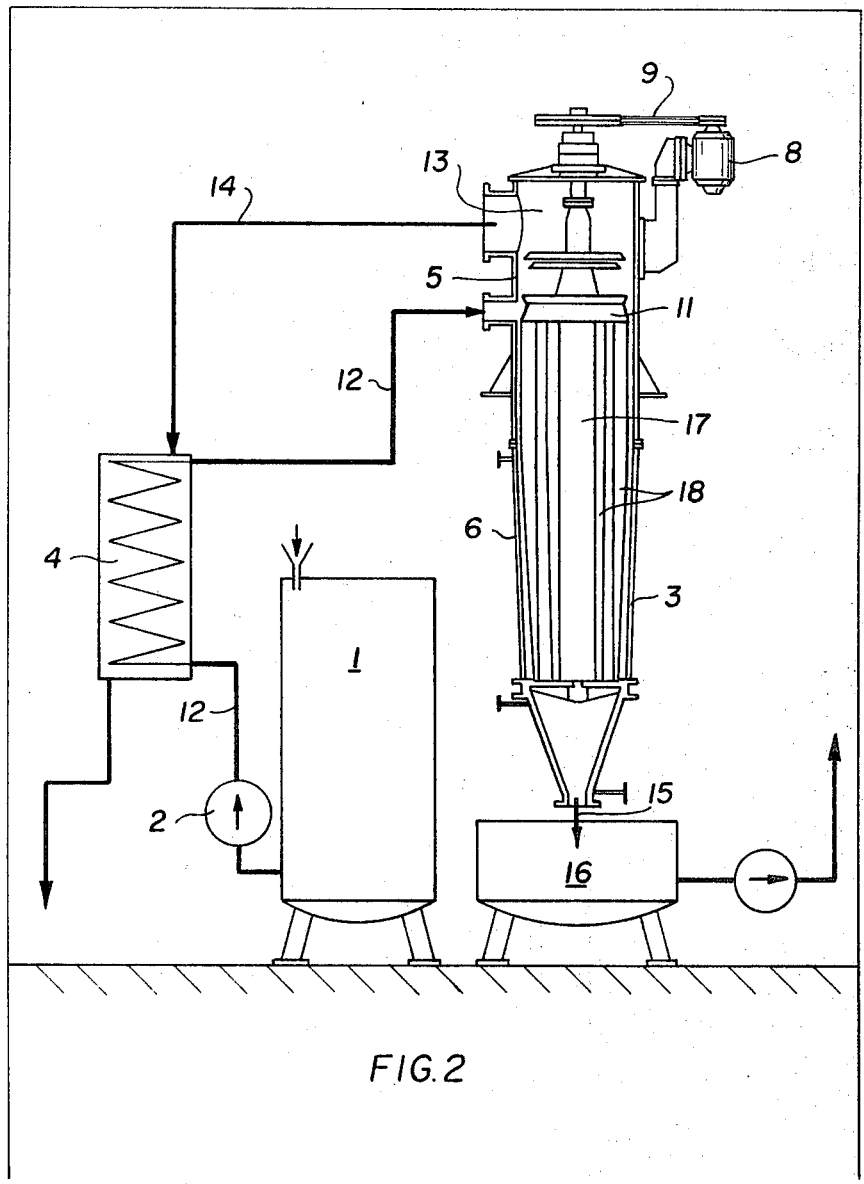
FIG. 2 is a diagrammatic view of another embodiment of the device for separating emulsions.

As seen in FIG. 2 the falling-film evaporator 3 may be provided with a rotor 17 having rigid scrapers 18. During rotation the rigid scrapers 18 spread out the emulsions to a thin film as already described with reference to FIG. 1. To increase separability, the heat of the vapour fed via the discharge pipe 14 to the condenser 4 is utilized to preheat the emulsion to be filled in the evaporator 3. To this end the feed pipe 12 passes through to condenser 4.

The present invention relating to a method and a device for separation of oil also allows vacuum operation for evaporation. That would be particularly advantageous since by reducing the boiling point improved separating results could be obtained for certain emulsions. Another advantage is that the salts contained in the emulsions are almost entirely retained in the separated oil.

The invention is of course not limited to the described and illustrated devices. It is also possible to use a falling-film evaporator without mechanical stirrer where the emulsion is spread out to a thin film for instance by arrangements generating a helical twist along the side walls, and by aid of recirculating gas.

What is claimed is:

1. Method for separating water from emulsions of used-up oil, emulsifiers and water, comprising the steps of causing said emulsion to fall in a vertical path, forcing the falling emulsion to be spread to form thin film, maintain said thin falling film of emulsion while simultaneously creating turbulence therein, heating the film as it falls to evaporate the water contained in the emulsion, removing the water vapor thus produced and permitting the residual oil and emulsifiers to fall out of the lower end of said path.

2. The method of claim 1, including the step of agitating the thin film to make it turbulent.

References Cited

Berkman et al.: Emulsions and Foams, Reinhold (1941), pp. 253–257 and 267.

JOHN D. WELSH, Primary Examiner

U.S. Cl. X.R.

159—6 W; 252—346, 347, 362